United States Patent [19]
Kanter

[11] Patent Number: 6,090,462
[45] Date of Patent: Jul. 18, 2000

[54] SHOCK ABSORBING CARPET SYSTEM

[76] Inventor: Ray D. Kanter, 10723 Preston Rd. #243, Dallas, Tex. 75230

[21] Appl. No.: 08/971,524

[22] Filed: Nov. 17, 1997

[51] Int. Cl.[7] ....................................................... B32B 3/02
[52] U.S. Cl. ....................... 428/40.1; 296/39.1; 296/39.2; 428/41.8; 428/95; 428/96
[58] Field of Search ................................. 428/40.1, 41.8, 428/95, 96; 296/39.1, 39.2

[56] References Cited

U.S. PATENT DOCUMENTS 3,577,894  5/1971  Emerson ..................................... 404/31
3,616,138  10/1971  Wentworth ................................. 428/96

*Primary Examiner*—Nasser Ahmad
*Attorney, Agent, or Firm*—Morgan L Crow, P.E.

[57] ABSTRACT

A carpet mat assembly with shock absorbing properties includes a mat made of closed cell foam sections. The mat sections are sized to be readily portable, preferably 4 ft by 6 ft in size. The mat thickness is selected to conform to ASTM F1292-96. Preferably, the mat thickness is 1⅛" thick. The mat section is coated with a pressure sensitive adhesive covering on one side of the mat. The pressure sensitive adhesive is covered with a removable liner. The liner is removed to expose the pressure sensitive adhesive. Carpet is applied to the coated surface of the mat and the pressure sensitive adhesive bonds the carpet to the mat. The outer perimeters of each mat may be lined with 3M Velcro® for attaching multiple sections of the carpet mat assembly securely together. On the outer perimeter of mat sections not joined to other mat sections, an edge molding preferably made from the same closed cell foam, may be attached to the mat with a contact adhesive, or by other means. The completed assembly provides a floor or ground surface safe for playgrounds, schools, child care centers, martial arts, gymnasiums or other areas where shock absorbing surfaces are required.

2 Claims, 1 Drawing Sheet

SHOCK ABSORBING CARPET SYSTEM

BACKGROUND OF THE INVENTION

1. Related Prior Art

In U.S. Pat. No. 5,658,430 issued to Drake and Herrin in 1997 there is illustrated new wall to wall carpeting applied directly over worn carpeting having a backing secured to a hard floor surface, by spraying an adhesive onto the top pile surface of the old carpet.

In U.S. Pat. No. 4,647,484 issued to Higgins in 1983 there is illustrated an underlay for carpets having a scrim supported lower foam rubber portion and a Mylar upper portion having adhesive on both sides to provide an attachment to the lower portion and an adhesive upper portion for attachment to a carpet tile. The upper portion is protected by a release paper, which is removed before installation.

In U.S. Pat. No. 5,304,268 issued to Hoopengardner in 1994 there is illustrated a carpet pad having a pressure sensitive adhesive for retaining the carpet and pad in place on a floor.

In U.S. Pat. No. 4,990,399 issued to Hoopengardner in 1991 there is illustrated a carpet cushion of compressible foam having a pressure sensitive adhesive applied for retaining the carpet and pad in place on a floor, and having a spacer element laid into the adhesive after the adhesive is applied.

In U.S. Pat. No. 4,804,567 issued to Reuben in 1989 there is illustrated an automobile carpet having a carpet pad attaching means removably connected by a pressure sensitive adhesive.

In U.S. Pat. No. 4,797,170 issued to Hoopengardner in 1989 there is illustrated a carpet and pad with a pressure sensitive adhesive on one surface.

In U.S. Pat. No. 4,557,774 issued to Hoopengardner in 1989 there is illustrated a carpet and pad with a pressure sensitive adhesive on its upper and lower surface.

In U.S. Pat. No. 5,160,770 issued to Hoopengardner in 1992 there is illustrated a carpet and pad with a sealed surface and pressure sensitive adhesive applied to one or both sealed surfaces of the pad. Also illustrated is application of a hot melt pressure sensitive adhesive onto an unsealed pad surface.

2. Field of the Invention

In the installation of carpeting, it is known to place a carpet mat made of urethane foam or other open cell compressible material between the carpet and the floor. It is also known to use a pressure sensitive adhesive to bond the carpet to the carpet mat, and/or to bond the carpet mat to the floor. These inventions have been applied to wall to wall carpet systems. Because of the permeability of conventional carpet mat materials, undesirable wicking of the adhesive material into the mat occurs. Additionally, conventional systems are designed for comfortable walking, but provide inadequate protection during a fall.

It is desirable to eliminate the problem of wicking of adhesive material into the compressible material of the carpet mat. It is also desirable to develop a shock absorbing carpet system that protects people from injury in the event of a fall, where activity is such that a fall is likely. Places where the likelihood of a fall exists often host a variety of different events, or the use of a space of multiple utility, with varying requirements for the size and design of the flooring. Accordingly, there is a need for a shock absorbing carpet mat assembly that is both portable and configurable, into a variety of shapes and sizes.

BRIEF SUMMARY OF THE INVENTION

A carpet assembly with shock absorbing properties for preventing injury comprising a mat of closed cell foam composition having shock damping properties and having a top side arid a bottom side and predetermined thickness and perimeter edges connecting the top side and the bottom side; a layer of pressure sensitive adhesive covering the top side of the mat, a layer of carpet having a top side and a bottom side, the bottom side of the carpet being fastened in contact with the pressure sensitive adhesive for adherence thereto. Preferably, the mat is substantially 1 ⅛ inch thick, and has impact attenuation in compliance with ASTM F-1 292-96. The present invention is directed to the problem of safety in the design of flooring where people are likely to fall down, such as, playgrounds, child care centers, gymnasiums, and the like. These areas often require portability of such flooring systems, size variation, and reconfiguration of the shape of the system, as the nature of the events may demand. The present invention may be installed wall to wall or as a portable system to cover only an area as required for an activity such as gymnastics. By incorporating a mat with an impact attenuation that satisfies ASTM F-1 292-96, the present invention provides a safe flooring system for a variety of applications where people are likely to fall down. The present invention eliminates undesirable wicking of the adhesive and the need for intermediate sealing systems, by using a closed cell carpet mat, which allows direct application of the adhesive.

DETAILED DESCRIPTION

Figure 1:
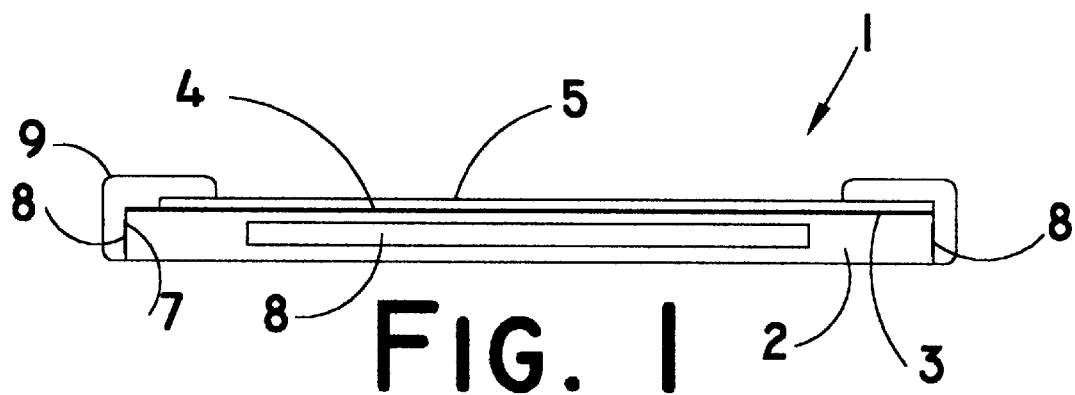
FIG. 1 is a cross-sectional view of a shock absorbing carpet mat assembly formed in accordance with this invention.

FIG. 1 is a cross-sectional view of a shock absorbing carpet mat assembly 1. The assembly includes a mat section 2 made of a closed cell material. In the preferred embodiment, mat section 2 has a thickness of 1 ⅛" or other as necessary to meet ASTM F-1 292-96. Variations in density and hardness of the mat, however, may allow a mat as thin as ½". I believe that with present materials, the mat should be at least ½" thick. In the preferred embodiment, mat section 2 is made in sections 4'×6'. The top side 3 of the mat section 2, is coated with a layer of pressure sensitive adhesive 4. Prior to assembly, the pressure sensitive adhesive 4 is covered with a removable liner (not shown) on the side opposite the mat section 2 to protect the pressure sensitive adhesive 4 from contact with any other surface during shipping and handling. The removable liner is removed to expose the surface of the pressure sensitive adhesive 4 prior to installation of the carpet 5. To install the carpet 5, the bottom side of the carpet 6 is place in direct contact with the pressure sensitive adhesive 4 and bonded thereto. The perimeter edges 7 of the mat section 2 may have Velcro® 8 attached. The Velcro® 8 allows easy attachment of other mat sections to create a larger, removable, protective floor surface. The Velcro® 8 also allows attachment of edge molding 9. The edge molding 9 provides a perimeter of the shock absorbing carpet mat assembly 1 that is both aesthetically appealing and protective. Alternatively, edge molding 9 can be permanently attached to mat section 2 and carpet 5, with a contact cement or other adhesive.

Figure 2:
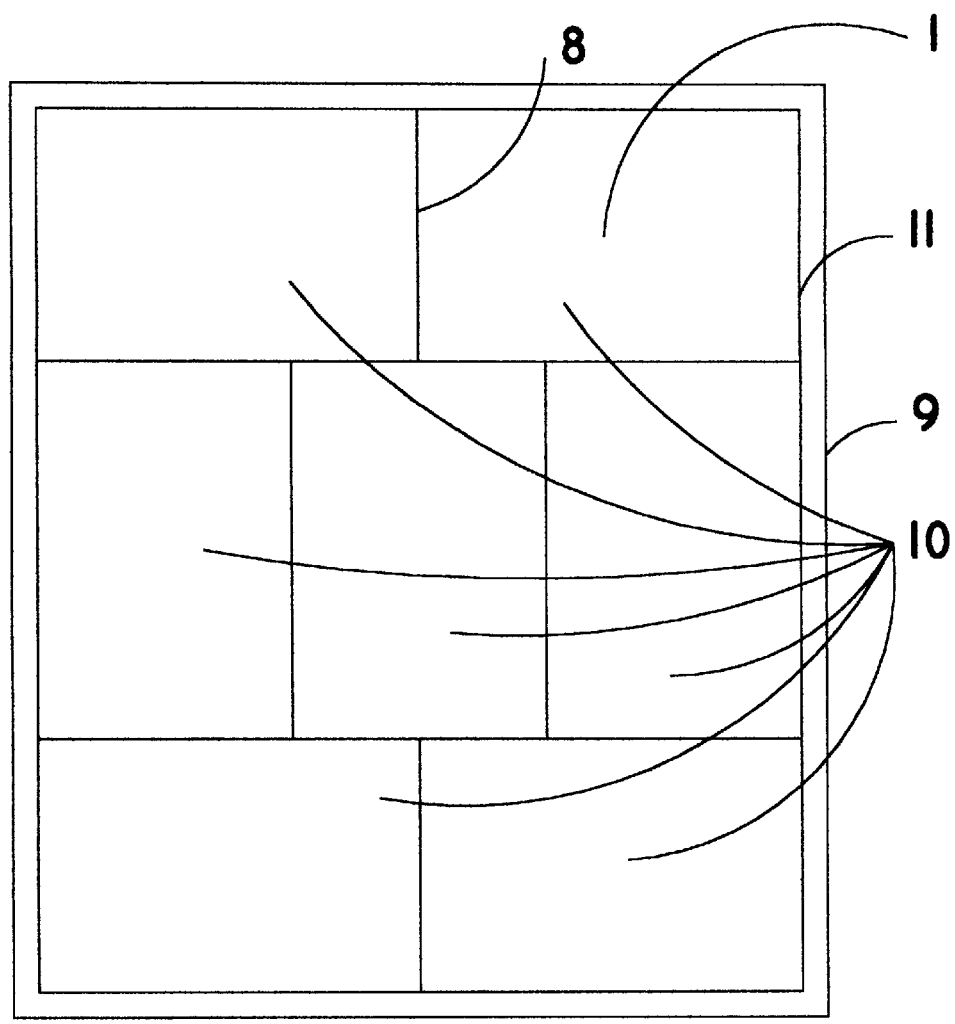
FIG. 2 is a top view of a shock absorbing carpet mat assembly showing multiple sections attached together in accordance with this invention.

FIG. 2 is a top view of a shock absorbing carpet mat assembly 1 showing multiple sections 10 attached contiguously together. The sections are attached by means of the Velcro® 8 along the perimeter edges 7 of each mat section 2. If the multiple sections 10 do not complete a carpet assembly that is wall to wall in a room, the outside edge 11 of the multiple sections 10 can have edge molding 9 attached, preferably with contact cement. Preferably the edge molding is of closed cell foam, similar or identical to the mat 2. Preferably, Velcro® is affixed to at least one perimeter edge of each individual assembly for detachably attaching multiple sections of the carpet mat assembly into a unit.

The American Society for Testing and Materials has issued ASTM F-1 292-96 Standard Specification for Impact Attenuation of surface Systems Under and Around Playground Equipment. This specification limits the maximum impact force to 200 times the force of gravity, from a specified height. My carpet mat assembly in the preferred embodiment limits a fall from 48 inches to the specified impact limit. Applications of carpet mats need to be adapted to the potential fall distance of a person walking on the mat, or on top of any equipment above the mat.

I am disclosing a carpet assembly with shock absorbing properties for preventing injury comprising; a mat of closed cell foam composition having shock damping properties and having a top side and a bottom side and predetermined thickness and perimeter edges connecting said top side and said bottom side; a layer of pressure sensitive adhesive covering the top side of the mat, a layer of carpet having a top side and a bottom side, the bottom side of the carpet being fastened in contact with the pressure sensitive adhesive for adherence thereto. I am further disclosing a carpet mat assembly having a removable liner covering the pressure sensitive adhesive on the top side of the mat to protect the pressure sensitive adhesive from contact with any other surface, prior to fastening the carpet to the mat. I am further disclosing the method of manufacturing a carpet mat assembly steps of applying contact cement to one side of a closed cell foam mat having shock damping properties and having a predetermined thickness, and adhering the bottom side of a carpet, having a top side and a bottom side, to the pressure sensitive adhesive. Preferably, the method includes the additional steps after the step of applying the contact cement of applying a removable liner to the contact cement, and removing the removable liner prior to applying the carpet to the mat.

Although elements of the invention have been illustrated in the accompanying drawings and described in the foregoing description it will be understood that the invention is not limited to the embodiments disclosed, but is capable of rearrangements, modifications, substitutions and reversals of parts and elements without departing from the spirit of the invention.

What is claimed is:

1. A carpet assembly with shock absorbing properties comprising;

a mat of closed cell foam composition having shock damping properties and having a top side and a bottom side and predetermined thickness and perimeter edges connecting said top side and said bottom side;

a layer of pressure sensitive adhesive covering the top side of the mat, a layer of carpet having a top side and a bottom side, the bottom side of the carpet being fastened in contact with the pressure sensitive adhesive for adherence thereto, and an edge molding of closed cell foam attached to at least one perimeter edge of the carpet mat.

2. A carpet mat assembly as in claim 1, wherein the assembly is made of like portable sections removably secured contiguously together.

* * * * *